United States Patent
Markut

(10) Patent No.: US 9,170,428 B1
(45) Date of Patent: Oct. 27, 2015

(54) SUNLIGHT DIMMER SYSTEM

(71) Applicant: Matthew Markut, Clearwater, FL (US)

(72) Inventor: Matthew Markut, Clearwater, FL (US)

(*) Notice: Subject to any disclaimer, the term of this patent is extended or adjusted under 35 U.S.C. 154(b) by 0 days.

(21) Appl. No.: 14/557,561

(22) Filed: Dec. 2, 2014

(51) Int. Cl.
    *G02B 27/28* (2006.01)
    *B60J 3/02* (2006.01)
    *B60J 3/06* (2006.01)

(52) U.S. Cl.
    CPC ............ *G02B 27/281* (2013.01); *B60J 3/02* (2013.01); *B60J 3/0208* (2013.01); *B60J 3/06* (2013.01)

(58) Field of Classification Search
    CPC ........... G02B 27/281; B60J 3/02; B60J 3/06; B60J 3/0208
    USPC ........... 359/490.01, 490.02, 591, 596, 601, 359/609, 614, 885, 887–890, 892
    See application file for complete search history.

(56) References Cited

U.S. PATENT DOCUMENTS

| | | | | |
|---|---|---|---|---|
| 2,145,914 A * | 2/1939 | Bartels | ................... | G03B 17/12 359/489.19 |
| 2,311,840 A * | 2/1943 | Land | ..................... | B64C 1/1484 296/97.2 |
| 3,880,496 A * | 4/1975 | Davidyan | .............. | B64C 1/1484 359/490.02 |
| 4,579,426 A * | 4/1986 | Onufry | ................ | G02B 27/281 359/490.02 |
| 5,164,856 A * | 11/1992 | Zhang | ...................... | E06B 9/24 359/486.02 |
| 5,447,353 A * | 9/1995 | Cheng | ........................ | B60J 3/06 296/97.2 |
| 6,909,544 B2 * | 6/2005 | Kolosowsky | ........ | G02B 27/281 296/97.2 |
| 7,773,299 B2 * | 8/2010 | Martin | ............... | G02B 27/0107 296/97.1 |
| 7,965,443 B2 * | 6/2011 | Martin | .................. | G02B 27/281 359/371 |
| 8,634,137 B2 * | 1/2014 | Powers | ................ | G02B 5/0231 359/485.01 |
| 2008/0297898 A1 * | 12/2008 | Martin | ............... | G02B 27/0101 359/490.01 |
| 2010/0265583 A1 * | 10/2010 | Martin | ................. | G02B 27/281 359/490.01 |

* cited by examiner

*Primary Examiner* — Frank Font

(57) ABSTRACT

An optical filter assembly includes two similarly configured linear polarized filters. Each linear polarized filter is in a circular configuration, has parallel grating lines, and an exterior periphery. The optical filter assembly has two similarly configured U-shaped cross sectional annular supports. Each annular support is in a U-shaped cross sectional configuration. Each annular support receives and frictionally supports an associated one of the linear polarized filters. The optical filter assembly has an annular retention ring in a U-shaped cross sectional configuration. The annular retention ring receives and slidably supports the two annular supports. The two annular supports are disposed in sliding contact and movement with respect to each other. In this manner the linear polarized filters are individually rotated and the passage of sunlight there through may be varied.

5 Claims, 3 Drawing Sheets

SUNLIGHT DIMMER SYSTEM

BACKGROUND OF THE INVENTION

Field of the Invention

The present invention relates to a sunlight dimmer system and more particularly pertains to abating negative effects of sunlight on drivers and for adjusting the system as a function of the position of the driver with respect to the sunlight, the abating and the adjusting being done in a safe, convenient, and economical manner.

SUMMARY OF THE INVENTION

In view of the foregoing disadvantages inherent in the known types of dimmer systems of known designs and configurations now present in the prior art, the present invention provides an improved sunlight dimmer system. As such, the general purpose of the present invention, which will be described subsequently in greater detail, is to provide a new and improved sunlight dimmer system and method which has all the advantages of the prior art and none of the disadvantages.

From a broad viewpoint, the present invention is a sunlight dimmer system. An optical filter assembly is provided. The optical filter assembly includes two similarly configured linear polarized filters. Each linear polarized filter is in a circular configuration. Each linear polarized filter has parallel grating lines. Each linear polarized filter has an exterior periphery. The optical filter assembly has two similarly configured annular supports. Each annular support is in a U-shaped cross sectional configuration. Each annular support receives and frictionally supports an associated one of the linear polarized filters. The optical filter assembly has an annular retention ring. The annular retention ring is in a U-shaped cross sectional configuration. The annular retention ring receives and slidably supports the two annular supports. The two annular supports are disposed in sliding contact and movement with respect to each other. In this manner the linear polarized filters are individually rotated. Further in this manner the passage of sunlight there through may be varied.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sunlight dimmer system which has all of the advantages of the prior art and none of the disadvantages.

It is another object of the present invention to provide a new and improved sunlight dimmer system which may be easily and efficiently manufactured and marketed.

It is further object of the present invention to provide a new and improved sunlight dimmer system which is of durable and reliable constructions.

An even further object of the present invention is to provide a new and improved sunlight dimmer system which is susceptible of a low cost of manufacture with regard to both materials and labor, and which accordingly is then susceptible of low prices of sale to the consuming public, thereby making such sunlight dimmer system economically available to the buying public.

Lastly, another object of the present invention is to provide a sunlight dimmer system for abating negative effects of sunlight on drivers and for adjusting the system as a function of the position of the driver with respect to the sunlight, the abating and the adjusting being done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
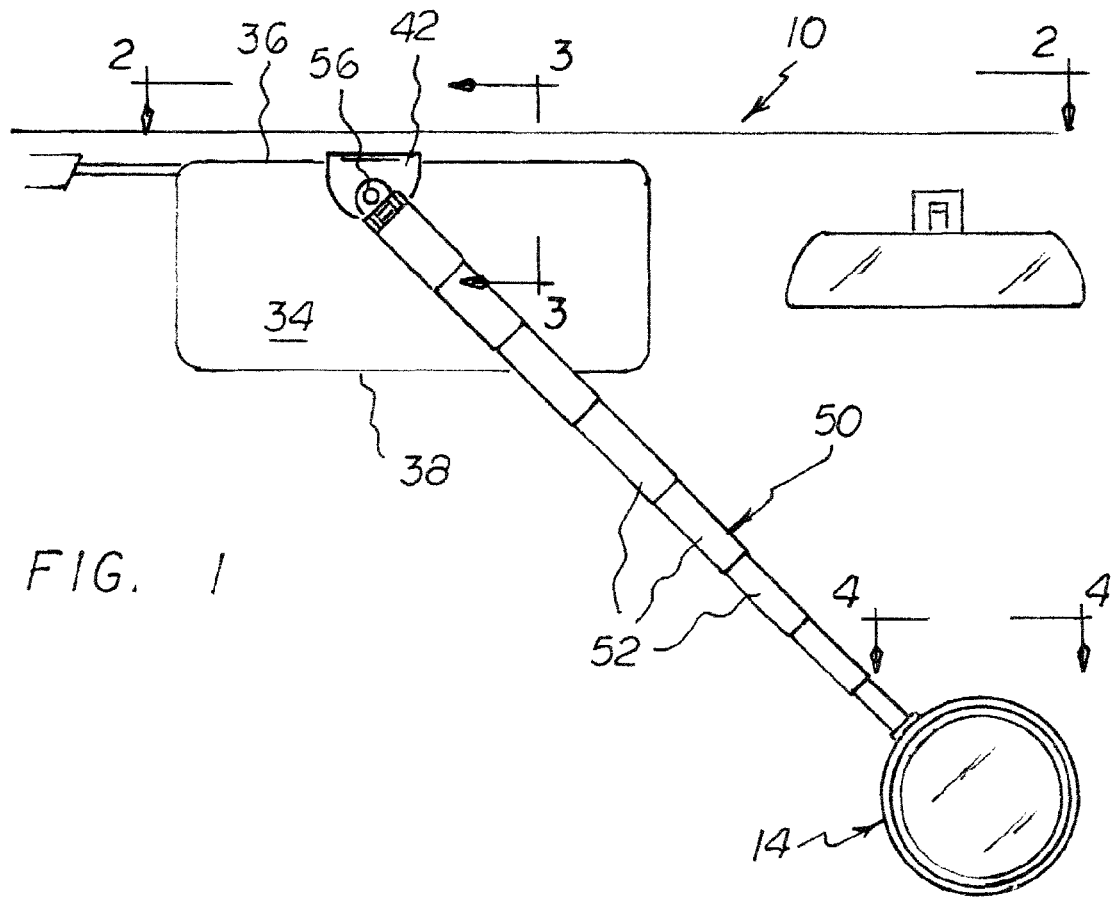
FIG. 1 is a front elevational view of a sunlight dimmer system constructed in accordance with the principles of the present invention.
Figure 2:
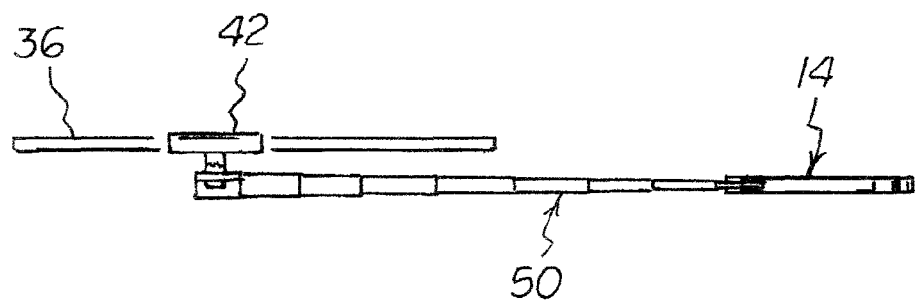
FIG. 2 is a plan view taken along line 2-2 of FIG. 1.
Figure 3:
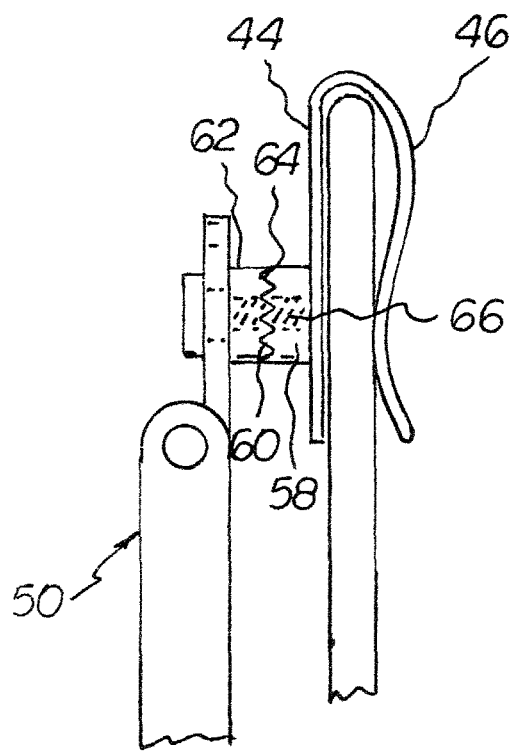
FIG. 3 is a side elevation view taken along line 3-3 of FIG. 1.
Figure 4:
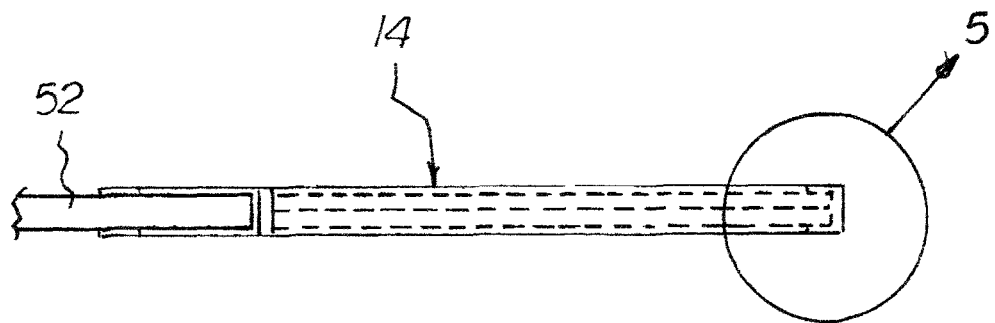
FIG. 4 is a plan view taken along line 4-4 of FIG. 1.
Figure 5:
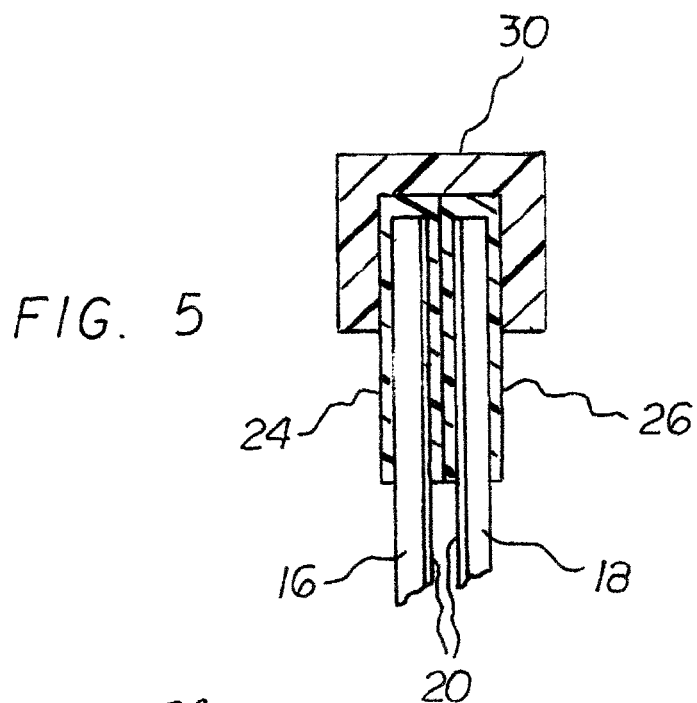
FIG. 5 is an enlarged plan view taken at circle 5 of FIG. 4.
Figure 6:
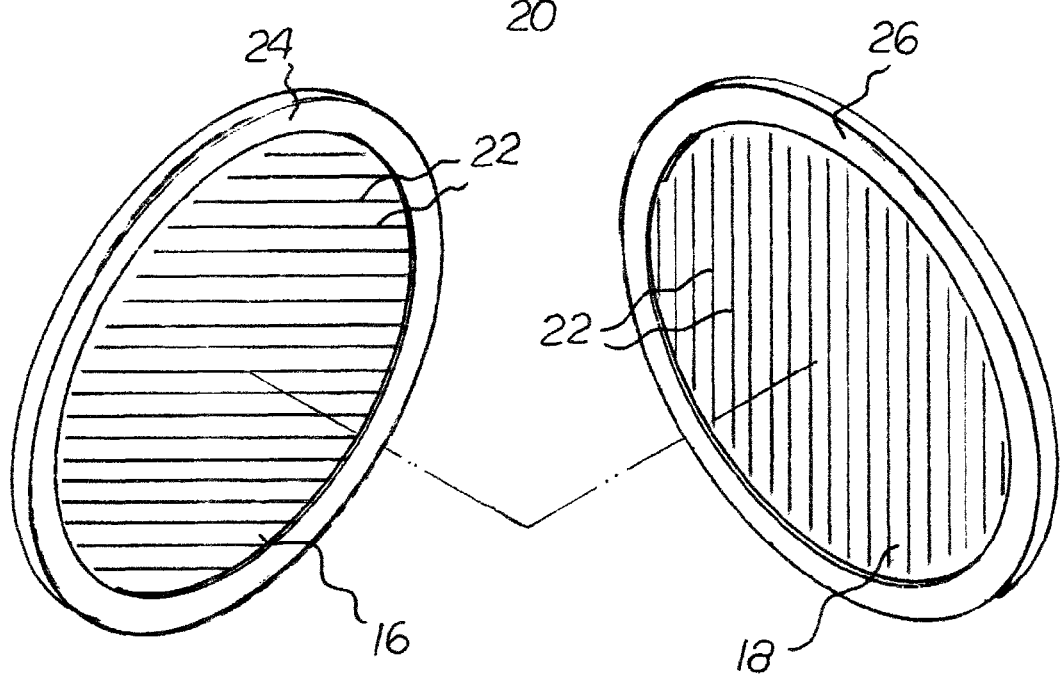
FIG. 6 is an enlarged perspective illustration of the lenses of the prior Figures.

With reference now to the drawings, and in particular to FIG. 1 thereof, the preferred embodiment of the new and improved sunlight dimmer system embodying the principles and concepts of the present invention and generally designated by the reference numeral 10 will be described.

The present invention, the sunlight dimmer system 10 is comprised of an optical filter assembly configured so as to attain the desired objective.

From a specific viewpoint, the present invention is a sunlight dimmer system. First provided is an optical filter assembly 14. The optical filter assembly includes two similarly configured linear polarized filters 16, 18. Each linear polarized filter is in a circular configuration. Each linear polarized filter has a diameter of 4.72 inches, plus or minus 10 percent. Each polarized filter has a thickness of 0.047 inches, plus or minus 10 percent. Each linear polarized filter has a plastic coating 20. Each linear polarized filter has parallel grating lines 22. Each linear polarized filter has an exterior periphery.

The optical filter assembly includes two similarly configured annular supports 24, 26. Each annular support is in a U-shaped cross sectional configuration. Each annular support has a radial length of 0.30 inches, plus or minus 10 percent. Each annular support receives and frictionally supports an associated one of the linear polarized filters.

The optical filter assembly further includes an annular retention ring 30. The annular retention ring is in a U-shaped cross sectional configuration. The annular retention ring has a radial length of 0.15 inches, plus or minus 10 percent. The annular retention ring receives and slidably supports the two annular supports. The two annular supports are disposed for contact and movement with respect to each other. In this manner the associated linear polarized filters are individually rotated. Further in this manner the passage of sunlight there through is varied.

A visor 34 is provided. The visor has an interior pivotal edge 36. The visor also has an exterior free edge 38.

Also provided is a clip 42. The clip has a flat face 44. The clip also has an S-shaped face 46. The clip is fabricated of spring steel. The clip is positioned over the interior pivotal edge of the visor. The flat face and the S-shaped face have a semi-circular exterior edge.

Provided next is an extender 50. The extender has an inner end. The inner end is coupled to the clip. The extender has an outer end. The outer end is coupled to the retention ring. The extender has eight telescoping sections 52. Each telescoping section is in a rectangular cross sectional configuration. In this manner axial rotation is abated. Each telescoping section has a decreasing circumference. In this manner the length of the extender is extended and contracted.

Further provided is an adjustment component 56. The adjustment component is located between the clip and the inner end of the extender. The adjuster component has a first cylinder 58. The first cylinder has an interior first end. The first end is attached to the clip. The first cylinder has an exterior first end. The first end has first teeth 60. The adjuster component has a second cylinder 62. The second cylinder has an interior second end. The interior second end is attached to the inner end of the extender. The second cylinder has an exterior second end. The second end has second teeth 64.

Provided last is a coil spring 66. The coil spring urges together the first teeth and the second teeth. In this manner rotational movement of the first cylinder and the second cylinder with respect to each other is allowed.

The relative adjustable position with respect to each other of the two circularly shaped linear polarized filters controls the intensity of the overwhelming sunlight and enables the driver to see everything else clearly not darker. The system is useful for all drivers, particularly truck drivers.

The clip, a clip on-slide on, is on the top of the sun visor and enables the extender to be moved right and left.

The telescopic extender enables the driver to put the optical filter assembly any place where the position of the sun is. The telescopic extender is rectangular so it is rigid and not spinning. The shorter segments are so when retracted it is out of the way. The clip on is half circle.

The optical filters are the size and thickness of a compact disk.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A sunlight dimmer system comprising:
   an optical filter assembly including two similarly configured linear polarized filters, each linear polarized filter having a circular configuration with parallel grating lines, each linear polarized filter having an exterior periphery;
   the optical filter assembly having two similarly configured annular supports, each annular support having a U-shaped cross sectional configuration, each annular support receiving and frictionally supporting an associated one of the linear polarized filters;
   the optical filter assembly having an annular retention ring having a U-shaped cross sectional configuration, the annular retention ring receiving and slidably supporting the two annular supports, the two annular supports being disposed in sliding contact and movement with respect to each other to thereby individually rotate the linear polarized filters for varying the passage of sunlight there through.

2. The system as set forth in claim 1 and further including:
   a visor having an interior pivotal edge and an exterior free edge;
   a clip having a flat face and an S-shaped face, the clip being fabricated of spring steel and positioned over the interior pivotal edge of the visor, the flat face and the S-shaped face having a semi-circular exterior edge;
   an extender, the extender having an inner end coupled to the clip, the extender having an outer end coupled to the annular retention ring, the extender being formed of a plurality of telescoping sections, each telescoping section having a rectangular cross sectional configuration to abate axial rotation, each telescoping section having a decreasing circumference for extending and contracting the length of the extender.

3. The system as set forth in claim 2 and further including:
   an adjustment component, the adjustment component located between the clip and the inner end of the extender, the adjuster component having a first cylinder with an interior first end attached to the clip, the first cylinder having an exterior first end with first teeth, the adjuster component having a second cylinder with an interior second end attached to the inner end of the extender, the second cylinder having an exterior second end with second teeth; and
   a coil spring urging together the first teeth and the second teeth for allowing rotational movement of the first cylinder and the second cylinder with respect to each other.

4. A sunlight dimmer system (10) for abating negative effects of sunlight on drivers and for adjusting the system as a function of the position of the driver with respect to the sunlight, the abating and the adjusting being done in a safe, convenient, and economical manner, the system comprising, in combination:

an optical filter assembly (14) including two similarly configured linear polarized filters (16), (18), each linear polarized filter having a circular configuration with a diameter of 4.72 inches, plus or minus 10 percent, and a thickness of 0.047 inches, plus or minus 10 percent, each linear polarized filter having a plastic coating (20), each linear polarized filter having parallel grating lines (22), each linear polarized filter having an exterior periphery;

the optical filter assembly having two similarly configured annular supports (24), (26), each annular support having a U-shaped cross sectional configuration with a radial length of 0.30 inches, plus or minus 10 percent, each annular support receiving and frictionally supporting an associated one of the linear polarized filters;

the optical filter assembly having an annular retention ring (30), the annular retention ring having a U-shaped cross sectional configuration with a radial length of 0.15 inches, plus or minus 10 percent, the annular retention ring receiving and slidably supporting the two annular supports, the two annular supports being disposed for contact and movement with respect to each other to thereby individually rotate the associated linear polarized filters for varying the passage of sunlight there through;

a visor (34) having an interior pivotal edge (36) and an exterior free edge (38);

a clip (42) having a flat face (44) and an S-shaped face (46), the clip being fabricated of spring steel and positioned over the interior pivotal edge of the visor, the flat face and the S-shaped face having a semi-circular exterior edge;

an extender (50), the extender having an inner end coupled to the clip, the extender having an outer end coupled to the retention ring, the extender formed of eight telescoping sections (52), each telescoping section having a rectangular cross sectional configuration to abate axial rotation, each telescoping section having a decreasing circumference for extending and contracting the length of the extender;

an adjustment component (56), the adjustment component located between the clip and the inner end of the extender, the adjuster component having a first cylinder (58) with an interior first end attached to the clip, the first cylinder having an exterior first end with first teeth (60), the adjuster component having a second cylinder (62) with an interior second end attached to the inner end of the extender, the second cylinder having an exterior second end with second teeth (64); and a coil spring (66) urging together the first teeth and the second teeth for allowing rotational movement of the first cylinder and the second cylinder with respect to each other.

5. A sunlight abating system (10) for abating negative effects of sunlight on drivers and for adjusting the system as a function of the position of the driver with respect to the sunlight, the abating and the adjusting being done in a safe, convenient, and economical manner, the system comprising, in combination:

an optical light abater having a geometric configuration with an exterior periphery;

a peripheral support having a U-shaped cross sectional configuration receiving and supporting the optical light abater;

a visor having an interior pivotal edge and an exterior free edge;

a clip having a flat face and an S-shaped face, the clip being fabricated of a resilient material and positioned over the interior pivotal edge of the visor, the flat face and the S-shaped face having a semi-circular exterior edge;

an extender having an inner end coupled to the clip, the extender having an outer end coupled to the support, the extender formed of a plurality telescoping sections, each telescoping section having a rectangular cross sectional configuration to abate axial rotation, each telescoping section having a decreasing circumference for extending and contracting the length of the extender;

an adjustment component, the adjustment component located between the clip and the inner end of the extender, the adjuster component having a first cylinder with an interior first end attached to the clip, the first cylinder having an exterior first end with first teeth, the adjuster component having a second cylinder with an interior second end attached to the inner end of the extender, the second cylinder having an exterior second end with second teeth; and a coil spring urging together the first teeth and the second teeth for allowing rotational movement of the first cylinder and the second cylinder with respect to each other.

\* \* \* \* \*